Dec. 8, 1964    J. L. DE VRIES    3,160,747
X-RAY ANALYSIS APPARATUS COMPRISING A FIXED DETECTOR
MEANS AND PLURAL INTERCHANGEABLE ANALYZING CRYSTALS
Filed May 12, 1961

INVENTOR
JOHAN L. DE VRIES

BY
AGENT

United States Patent Office 3,160,747
Patented Dec. 8, 1964

3,160,747
X-RAY ANALYSIS APPARATUS COMPRISING A FIXED DETECTOR MEANS AND PLURAL INTERCHANGEABLE ANALYZING CRYSTALS
Johan Louis de Vries, Emmasingel, Eindhoven, Netherlands, assignor to North American Philips Company, Inc., New York, N.Y., a corporation of Delaware
Filed May 12, 1961, Ser. No. 109,618
Claims priority, application Netherlands June 1, 1960
4 Claims. (Cl. 250—51.5)

Apparatus for carrying out X-ray fluorescence analyses serve for a spectrochemical examination of materials and are frequently used to trace and analyze small quantities of foreign substances in a product to be manufactured. The presence of these substances is often known and the examination is then intended to assess the quantity or to check the presence of quantities subjected to given tolerances. Such apparatus have an analyzing crystal and a detector, which are coupled with each other so as to be movable in a sense such that in each position of the crystal the radiation deflected by reflection strikes the detector. It has been proposed to arrange more than one crystal and to choose different distances between the lattice surfaces in order to enlarge the measuring range.

The invention relates to an apparatus for X-ray fluorescence examination comprising more than one analyzing crystal, of which the distances between the lattice surfaces are different, and has for its object to provide an apparatus of simple structure, by means of which a routine examination, i.e. the frequent checking of a product to be manufactured with respect to the presence of given substances, can be rapidly carried out. In accordance with the invention the crystals are displaceable and may be arranged one after the other in the beam to be analyzed, the angle between the reflection surface and the beam being substantially the same for each crystal. The lattice surfaces are furthermore chosen so that rays of a given wavelength are directed by one of the crystals and rays of a different wavelength are directed by a different crystal, in order of succession to a stationary detector.

Consequently, during the examination no other operation is required than the alternate displacement of each of the crystals into the position in which they are struck by the beam to be examined. In order to prepare the correct adjustment, the detector is arranged, independently of the crystal arrangement, so as to be rotatable about a shaft located in the reflection surface of the operative crystal and at right angles to the beam striking this surface.

Figure 1:
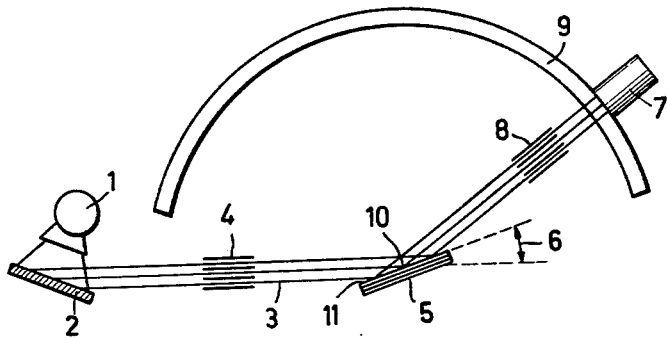
Figure 2:
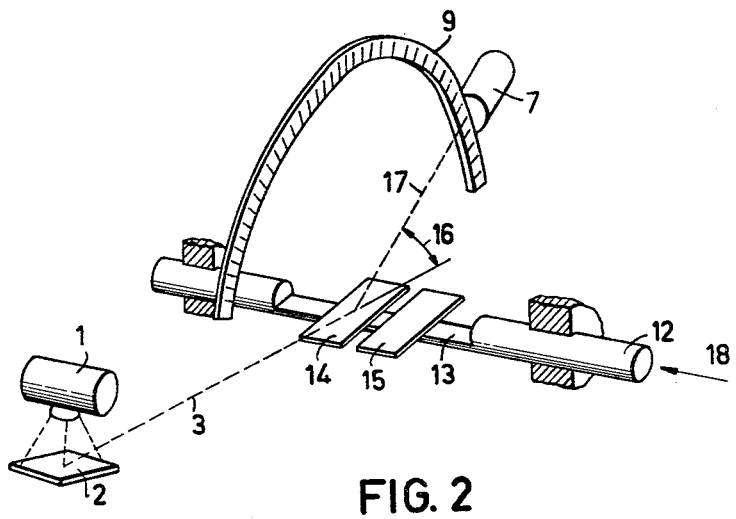

The arrangement of the various parts indispensable for carrying out a spectrochemical analysis is evident from the drawing, in which
FIG. 1 shows the principle and
FIG. 2 shows diagrammatically the system according to the invention.

When the X-ray tube 1 is operated, the object 2 to be examined is exposed. In choosing the load of the X-ray tube 1, it should be considered that X-rays of such a wavelength are obtained that the materials, the presence of which is to be proved, are capable of emitting secondary X-rays. Since it is intended to determine the presence and the quantity of given materials, it is also known which voltage is required at the X-ray tube to produce the natural radiation of these materials.

A narrow beam 3 of the radiation thus produced passes a collimator 4, which may be a set of parallel plates, known under the name of "Soller Slits," and is directed towards an analyzing crystal 5. The rays striking the crystal at an angle 6, produce a reflected ray beam if in accordance with the known Bragg condition:

$$n\lambda = 2d \sin \theta$$

wherein $\lambda$ is the wavelength of the rays, $d$ the distance between the crystal lattice surfaces, and $n$ is a whole number, the reflection angle 6 corresponds to the angle $\theta$. In the direction of the reflected ray beam is arranged the detector 7, comprising a proportional counter, a Geiger counter or a scintillation counter. For accurate measurements it is desirable that the reflected radiation pass through a second collimator 8. It is known to provide a mechanism by means of which the detector 7 maintains its correct position relative to the crystal 5 when the detector 7 during the examination is displaced along an arc of a circle 9, of which the center 10 lies in the reflection surface 11 of the crystal.

In order to measure radiation of a given wavelength $\lambda$ the crystal 5 occupies an accurately defined position and the position of the detector 7 is then also determined by the mechanically operating mechanism which moves the detector through twice the angle of the crystal rotation. This mechanism is not shown in the drawings. In order to measure radiation of a different wavelength the crystal 5 and the detector 7 are rotated. If the examination is restricted to, for example, rays of two given wavelengths, two stops have been provided to mark the adjustments, in which radiations of these wavelengths are reflected by the crystal 5 and strike the detector 7.

In accordance with the invention the process differs from the usual method in that the mechanically operating mechanism is not used. A fixed position of the detector 7 is chosen, while the angle between the rays striking the crystal and the reflected rays is derived from the aforesaid Bragg condition. It has been found that for different wavelengths crystals can be found the lattice surface distances of which exhibit such differences that for the rays of one wavelength and for the rays with a different wavelength the Bragg angle is substantially the same. In the following table a number of examples is given. It is not difficult to compose a greater number of examples.

| Material and radiation | Crystal | Order of reflection | Bragg angle $2\theta$, degrees |
|---|---|---|---|
| Co $k_\beta$ | NaCl | $n=1$ | 33.41 |
| Cu $k_\alpha$ | AdP | $n=2$ | 33.67 |
| Co $k_\alpha$ | NaCl | $n=1$ | 37.02 |
| Cu $k_\beta$ | Eddt | $n=1$ | 36.85 |
| Zn $k_\beta$ | NaCl | $n=1$ | 26.57 |
| Cu $k_\alpha$ | Quartz | $n=1$ | 26.07 |

The crystals used are: NaCl, sodium chloride; AdP, ammoniumdiphosphate; Eddt, ethyldiaminotartrate.

As is shown in FIG. 2, the X-ray tube 1 irradiates an object 2, which may contain quantities of cobalt and copper or zinc and copper. On a shaft 12, which is flattened in the center 13, are fastened side by side two crystals 14 and 15. If the cobalt and copper content of the object 2 is to be examined, use may be made of a crystal 14 of NaCl and a crystal 15 of AdP. The cobalt $k_\beta$ radiation is reflected by the NaCl crystal 14 at an angle 16 of $33.41° = 2\theta$ and in the direction of the reflected radiation 17 the detector 7 is arranged. By displacing the shaft 12 to the left in the direction of the arrow 18, the second crystal 15 arrives in the beam of rays 3. An AdP crystal reflects the copper $k_\alpha$ radiation in substantially the same direction 17. The small difference of 0.26° requires a minimum correction of the position of the crystal 15, which may be carried out without a change in the position of the detector 7, since this correction is much smaller than the width of the window through which the rays can reach the radiation-sensitive medium in the detector.

In order to exhibit the $k\alpha$ radiation of cobalt and the $k\beta$ radiation of copper, the detector 7 is arranged in the position associated with the radiation reflection angle $2\theta = 37.02°$ of the NaCl crystal and of the Eddt crystal. This position may be found on the circular, suitably divided measuring staff 9 and the adjustment of the crystal shaft is found at the maximum indication of the detector. In this position measurements can be rapidly carried out on several objects containing the substances to be detected, which is particularly important for a regular check of the uniformity of the composition in the manufacture of a given product, the accomplishment of routine examinations being thus furthered.

The disposition of the crystals 14, 15 side by side on the shaft 12, which is therefore displaced in a longitudinal sense to bring one crystal out of the path of the radiation and the other crystal into it, may be replaced by an arrangement in which the crystals are fastened one on each side of the shaft, parallel to each other, the shaft being then turned through 180° to change over from one adjustment to the other. Other arrangements in which the shaft is turned through a smaller angle are also possible.

What is claimed is:

1. Apparatus for determining the elemental constitution of a sample of material comprising means to irradiate the sample with a beam of X-rays to produce characteristic secondary X-rays from elements in the sample, fixed detector means for detecting X-rays emitted by elements in the sample, and means to analyze and reflect X-rays having wave-lengths characteristic of each element in the sample independently to the detector means, said reflection means comprising a plurality of crystals, and means to interpose said crystals successively in reflecting position between the sample and the detector, each of said crystals having lattice parameters at which wave-lengths corresponding to each of said elements in said sample are reflected at substantially the same angle to said fixed detector means.

2. Apparatus for determining the elemental constitution of a sample of material comprising means to irradiate the sample with a beam of X-rays to produce a beam of characteristic X-rays from elements in the sample, detector means for detecting the beam of X-rays emitted by elements in the sample including means to locate an X-ray detector in fixed position to receive X-rays emitted by the sample, means to analyze and reflect X-rays having wave-lengths characteristic of each element in the sample independently to the detector, said reflection means comprising a plurality of crystals each having a surface from which X-rays are reflected parallel to a given axis, and means to interpose said crystals successively in reflecting position between the sample and the detector, each of said crystals having lattice parameters at which wave-lengths corresponding to each of said elements in said sample are successively reflected at substantially the same angle to said detector means.

3. Apparatus for determining the elemental constitution of a sample of material comprising means to irradiate the sample with a beam of X-rays to produce characteristic X-rays from elements in the sample, detector means for detecting X-rays emitted by elements in the sample, and means to analyze and reflect X-rays having wave-lengths characteristic of each element in the sample independently to the detector, said reflection means comprising a plurality of crystals positioned on a longitudinally displaceable support, and means to move said support and interpose said crystals successively in reflecting position between the sample and the detector, each of said crystals having lattice parameters at which wave-lengths corresponding to each of said elements in the sample are successively reflected at substantially the same angle to said detector means.

4. Apparatus for determining the elemental constitution of a sample of material comprising means to irradiate the sample with a beam of X-rays to produce a beam of characteristic X-rays from elements in the sample, detector means for detecting the beam of X-rays emitted by elements in the sample including means to rotate an X-ray detector about a given axis to locate the same in fixed position to receive X-rays emitted by the sample, means to analyze and reflect X-rays having wave-lengths characteristic of each element in the sample independently to the detector, said reflection means comprising a plurality of crystals each having a surface from which X-rays are reflected parallel to said given axis positioned on a longitudinally displaceable support, and means to move said support and interpose said crystals successively in reflecting position between the sample and the detector, each of said crystals having lattice parameters at which wave-lengths corresponding to each of said elements in the sample are successively reflected at substantially the same angle to said detector means.

References Cited in the file of this patent

UNITED STATES PATENTS

| | | |
|---|---|---|
| 2,750,512 | Meloy | June 12, 1956 |
| 2,835,820 | Birks | May 20, 1958 |
| 2,837,655 | Lang | June 3, 1958 |
| 3,060,314 | Wytzes | Oct. 23, 1962 |